US010719076B1

(12) United States Patent
Gavrilets et al.

(10) Patent No.: US 10,719,076 B1
(45) Date of Patent: Jul. 21, 2020

(54) LEAD AND FOLLOWER AIRCRAFT NAVIGATION SYSTEM

(71) Applicant: Rockwell Collins, Inc., Cedar Rapids, IA (US)

(72) Inventors: Vladislav Gavrilets, McLean, VA (US); Christopher M. Boggs, Gainesville, VA (US); Max G. Taylor, Houston, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/284,362

(22) Filed: Feb. 25, 2019

(51) Int. Cl.
*G05D 1/00* (2006.01)
*G05D 1/08* (2006.01)
*G01S 19/51* (2010.01)

(52) U.S. Cl.
CPC ............ *G05D 1/0027* (2013.01); *G01S 19/51* (2013.01); *G05D 1/0808* (2013.01)

(58) Field of Classification Search
CPC ..... G05D 1/0027; G05D 1/0808; G01S 19/51
See application file for complete search history.

(56) References Cited

U.S. PATENT DOCUMENTS

| | | | | |
|---|---|---|---|---|
| 6,292,752 B1 * | 9/2001 | Franke | ................. | G01S 13/867 701/300 |
| 7,418,343 B1 * | 8/2008 | McGraw | .................... | G01S 3/36 244/76 R |
| 8,352,111 B2 * | 1/2013 | Mudalige | ................. | G08G 1/22 340/435 |
| 8,849,481 B1 * | 9/2014 | Gavrilets | ............. | G05D 1/0653 701/15 |
| 8,949,090 B2 * | 2/2015 | Whitehead | ........... | G05D 1/0825 703/3 |
| 9,102,406 B2 * | 8/2015 | Stark | ..................... | B64C 39/024 |
| 9,415,869 B1 * | 8/2016 | Chan | ..................... | G05D 1/104 |
| 9,513,130 B1 * | 12/2016 | Boggs | ................. | G01C 21/165 |

(Continued)

OTHER PUBLICATIONS

Shuwu Wu, et al., Geometry Extra-Redundant Almost Fixed Solutions: A High Integrity Approach for Carrier Phase Ambiguity Resolution for High Accuracy Relative Navigation, IEEE Xplore, May 2008, pp. 568-582, 2008 IEEE/ION Position, Location and Navigation Symposium, IEEE.

*Primary Examiner* — Frederick M Brushaber
(74) *Attorney, Agent, or Firm* — Suiter Swantz pc llo

(57) ABSTRACT

A system may include a follower aircraft including a processor configured to: determine a follower aircraft location at a time $t_0$; receive a real-time kinematics (RTK) update from a lead aircraft, the RTK update including information associated with: a lead aircraft location at the time $t_0$, the lead aircraft location at a time $t_1$ relative to the lead aircraft location at the time $t_0$, and an object location at the time $t_1$ relative to the lead aircraft location at the time $t_1$; perform RTK processing to determine the follower aircraft location at the time $t_0$ relative to the lead aircraft location at a time $t_0$; determine the follower aircraft location at a time $t_2$ relative to the follower aircraft location at the time $t_0$ by utilizing time relative navigation (TRN); and determine the object location at time $t_2$ relative to the follower aircraft location at the time $t_2$.

20 Claims, 4 Drawing Sheets

(56) References Cited

U.S. PATENT DOCUMENTS

| | | | | |
|---|---|---|---|---|
| 9,821,903 | B2* | 11/2017 | Pachikara | B64C 9/00 |
| 2012/0004844 | A1* | 1/2012 | Sahasrabudhe | G05D 1/104 |
| | | | | 701/300 |
| 2015/0151725 | A1* | 6/2015 | Clarke | G06T 7/70 |
| | | | | 701/28 |
| 2018/0099663 | A1* | 4/2018 | Diedrich | G06T 11/60 |
| 2018/0210454 | A1* | 7/2018 | Ready-Campbell | |
| | | | | G05D 1/0274 |
| 2018/0245308 | A1* | 8/2018 | Ready-Campbell | E02F 3/434 |
| 2019/0079540 | A1* | 3/2019 | Yoon | H04W 4/40 |
| 2019/0129440 | A1* | 5/2019 | Borhan | G05D 1/0088 |
| 2020/0032490 | A1* | 1/2020 | Ready-Campbell | |
| | | | | G05D 1/0088 |
| 2020/0057453 | A1* | 2/2020 | Laws | B60W 30/188 |
| 2020/0074735 | A1* | 3/2020 | Nowakowski | G06T 19/006 |
| 2020/0094839 | A1* | 3/2020 | Clarke | B60W 30/14 |

* cited by examiner

LEAD AND FOLLOWER AIRCRAFT NAVIGATION SYSTEM

GOVERNMENT LICENSE RIGHTS

This invention was made with government support under Task Assignment 2016-333-04 under the Vertical Lift Consortium (VLC) Other Transaction Agreement (OTA) W15QKN-16-9-1001 awarded by the Department of Defense. The government has certain rights in the invention.

CROSS-REFERENCE TO RELATED APPLICATIONS

The present application is related to: a) U.S. patent application Ser. No. 13/835,847, filed on Mar. 15, 2013, issued as U.S. Pat. No. 8,849,481 on Sep. 30, 2014; b) U.S. patent application Ser. No. 14/495,628, filed on Sep. 24, 2014, issued as U.S. Pat. No. 9,513,130 on Dec. 6, 2016; and c) U.S. patent application Ser. No. 15/473,438, filed on Mar. 29, 2017; which are hereby expressly incorporated herein in their entirety.

BACKGROUND

Degraded visual environment (DVE) conditions, such as a sandstorm, pose significant risks for helicopter operations. Sensors that can see through at least some types of DVE exist, but are large, heavy, and expensive. Including such sensors on each helicopter in a group of helicopters flying in a DVE would be expensive and increase overall operational expense for the group of helicopters.

SUMMARY

In one aspect, embodiments of the inventive concepts disclosed herein are directed to a system. The system may include a follower aircraft and a lead aircraft. The lead aircraft may include a sensor and a lead aircraft processor. The sensor may be configured to sense a location of an object in an environment relative to a location of the lead aircraft and output sensor data associated with the sensed location of the object. The lead aircraft processor may be communicatively coupled to the sensor. The lead aircraft processor may be configured to: receive the sensor data; determine a lead aircraft location at a time $t_0$ based at least on global navigation satellite system (GNSS) measurements; determine the lead aircraft location at a time $t_1$ relative to the lead aircraft location at the time $t_0$ by utilizing time relative navigation (TRN), wherein $t_1$ is after $t_0$; determine an object location at the time $t_1$ relative to the lead aircraft location at the time $t_1$ based at least on the sensor data; and output a real-time kinematics (RTK) update for transmission to the follower aircraft via a datalink, the RTK update including information associated with: the lead aircraft location at the time $t_0$, the lead aircraft location at the time $t_1$ relative to the lead aircraft location at the time $t_0$, and the object location at the time $t_1$ relative to the lead aircraft location at the time $t_1$. The follower aircraft may include a follower aircraft processor configured to: determine a follower aircraft location at the time $t_0$ based at least on GNSS measurements; receive the RTK update from the lead aircraft via the datalink; based at least on the RTK update, perform RTK processing to determine the follower aircraft location at the time $t_0$ relative to the lead aircraft location at a time $t_0$; determine the follower aircraft location at a time $t_2$ relative to the follower aircraft location at the time $t_0$ by utilizing TRN, wherein $t_2$ is after $t_1$; and determine the object location at time $t_2$ relative to the follower aircraft location at the time $t_2$ based at least on the follower aircraft location at the time $t_0$ relative to the lead aircraft location at a time $t_0$, the lead aircraft location at the time $t_1$ relative to the lead aircraft location at the time $t_0$, the object location at the time $t_1$ relative to the lead aircraft location at the time $t_1$, and the follower aircraft location at the time $t_2$ relative to the follower aircraft location at the time $t_0$.

In a further aspect, embodiments of the inventive concepts disclosed herein are directed to a system. The system may include a follower aircraft. The follower aircraft may include a follower aircraft processor configured to: determine a follower aircraft location at a time $t_0$ based at least on global navigation satellite system (GNSS) measurements; receive a real-time kinematics (RTK) update from a lead aircraft via a datalink, the RTK update including information associated with: a lead aircraft location at the time $t_0$, the lead aircraft location at a time $t_1$ relative to the lead aircraft location at the time $t_0$, and an object location at the time $t_1$ relative to the lead aircraft location at the time $t_1$, wherein $t_1$ is after $t_0$; based at least on the RTK update, perform RTK processing to determine the follower aircraft location at the time $t_0$ relative to the lead aircraft location at a time $t_0$; determine the follower aircraft location at a time $t_2$ relative to the follower aircraft location at the time $t_0$ by utilizing time relative navigation (TRN), wherein $t_2$ is after $t_1$; and determine the object location at time $t_2$ relative to the follower aircraft location at the time $t_2$ based at least on the follower aircraft location at the time $t_0$ relative to the lead aircraft location at a time $t_0$, the lead aircraft location at the time $t_1$ relative to the lead aircraft location at the time $t_0$, the object location at the time $t_1$ relative to the lead aircraft location at the time $t_1$, and the follower aircraft location at the time $t_2$ relative to the follower aircraft location at the time $t_0$.

In a further aspect, embodiments of the inventive concepts disclosed herein are directed to a system. The system may include a follower aircraft and a lead aircraft. The lead aircraft may include a sensor and a lead aircraft processor. The sensor may be configured to sense a location of an object in an environment relative to a location of the lead aircraft and output sensor data associated with the sensed location of the object. The lead aircraft processor may be communicatively coupled to the sensor. The lead aircraft processor may be configured to: receive the sensor data; determine a lead aircraft location at a time $t_0$ based at least on global navigation satellite system (GNSS) measurements; determine the lead aircraft location at a time $t_1$ relative to the lead aircraft location at the time $t_0$ by utilizing time relative navigation (TRN), wherein $t_1$ is after $t_0$; determine an object location at the time $t_1$ relative to the lead aircraft location at the time $t_1$ based at least on the sensor data; and output a real-time kinematics (RTK) update for transmission to the follower aircraft via a datalink, the RTK update including information associated with: the lead aircraft location at the time $t_0$, the lead aircraft location at the time $t_1$ relative to the lead aircraft location at the time $t_0$, and the object location at the time $t_1$ relative to the lead aircraft location at the time $t_1$.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
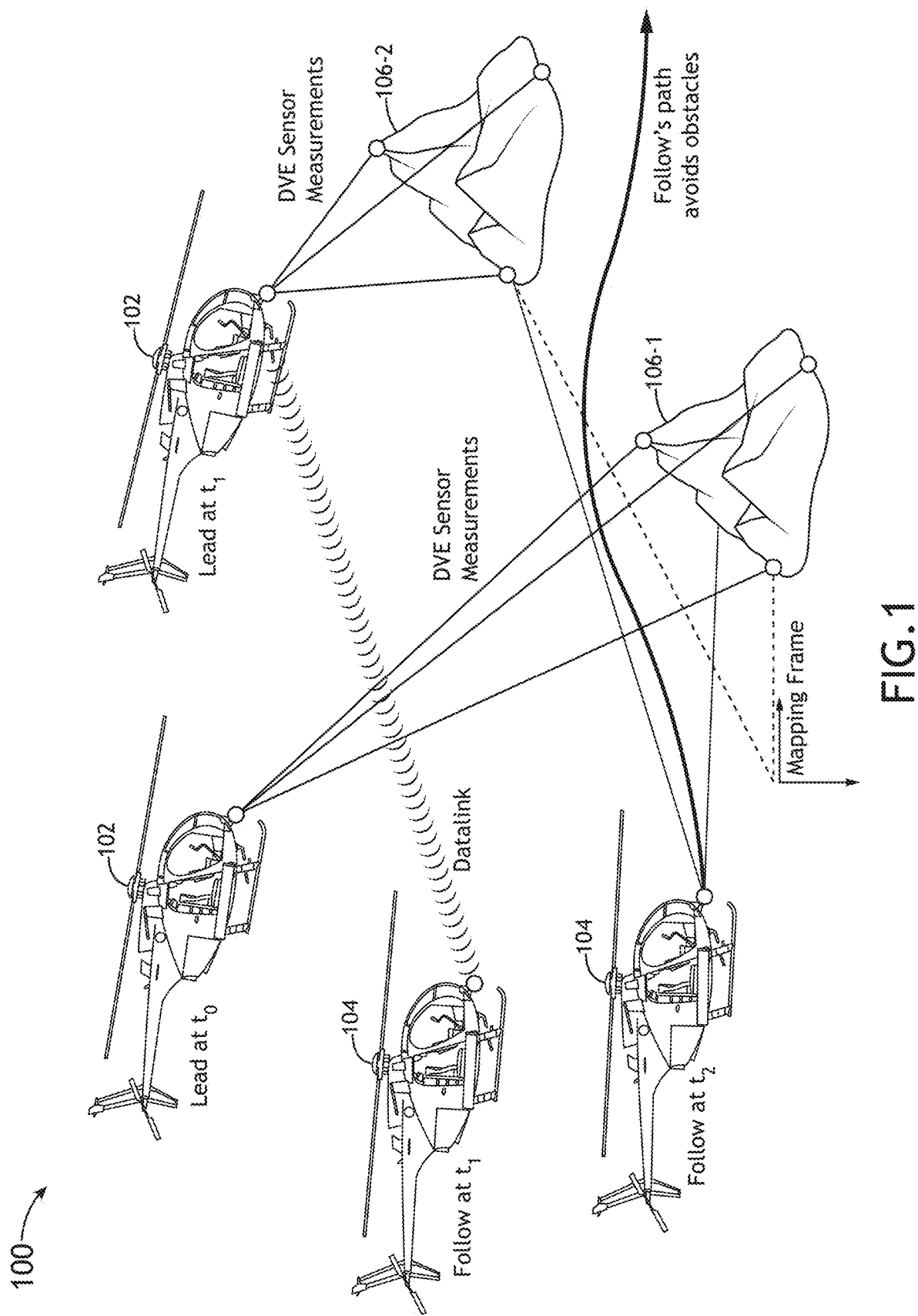
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a system and a method for transferring locations of objects of interest from a leader aircraft (e.g., a leader helicopter) to a follower aircraft (e.g., a follower helicopter) based on measurements from a global navigation satellite system (GNSS) (e.g., global positioning system (GPS)).

Referring now to FIG. 1, an exemplary system 100 according to the inventive concepts disclosed herein is depicted. The system may include a group of aircraft (e.g., 102 and 104: e.g., helicopters) and objects of interest 106-1, 106-2 (e.g., obstacles or landing zones). The group of aircraft may include at least one lead aircraft 102 (e.g., a lead helicopter) and at least one follower aircraft 104 (e.g., a follower helicopter). To improve multi-aircraft operations in a DVE with improved safety and affordability, embodiments may include some aircraft (e.g., the lead aircraft 102) equipped with capable sensors that may map an environment, locate objects of interest 106-1, 106-2 (e.g., landing zones and obstacles), and share location of these objects 106-1, 106-2 with other aircraft (e.g., the follower aircraft 104) on a same mission. To enable this concept, embodiments may include defining object 106-1, 106-2 locations in a common reference frame in which both the lead aircraft 102 (which maps the environment) and the follower aircraft 104 (which use the object location information to adjust a trajectory) know the object 106-1, 106-2 locations. This may allow object 160-1, 160-2 locations, originally measured with respect to the lead aircraft 102, to be expressed relative to the follower aircraft 104 for use in obstacle avoidance by the follower aircraft 104. This transfer of object 106-1, 106-2 locations, when used for safety-critical applications such as obstacle avoidance, may be performed with high confidence error bounds to ensure safety of the follower aircraft 104. For example, in a final phase of landing, the error bound requirement could be on the order of a few meters with a probability of error bound exceedance of $10^{-4}$/approach with high availability.

Figure 2:
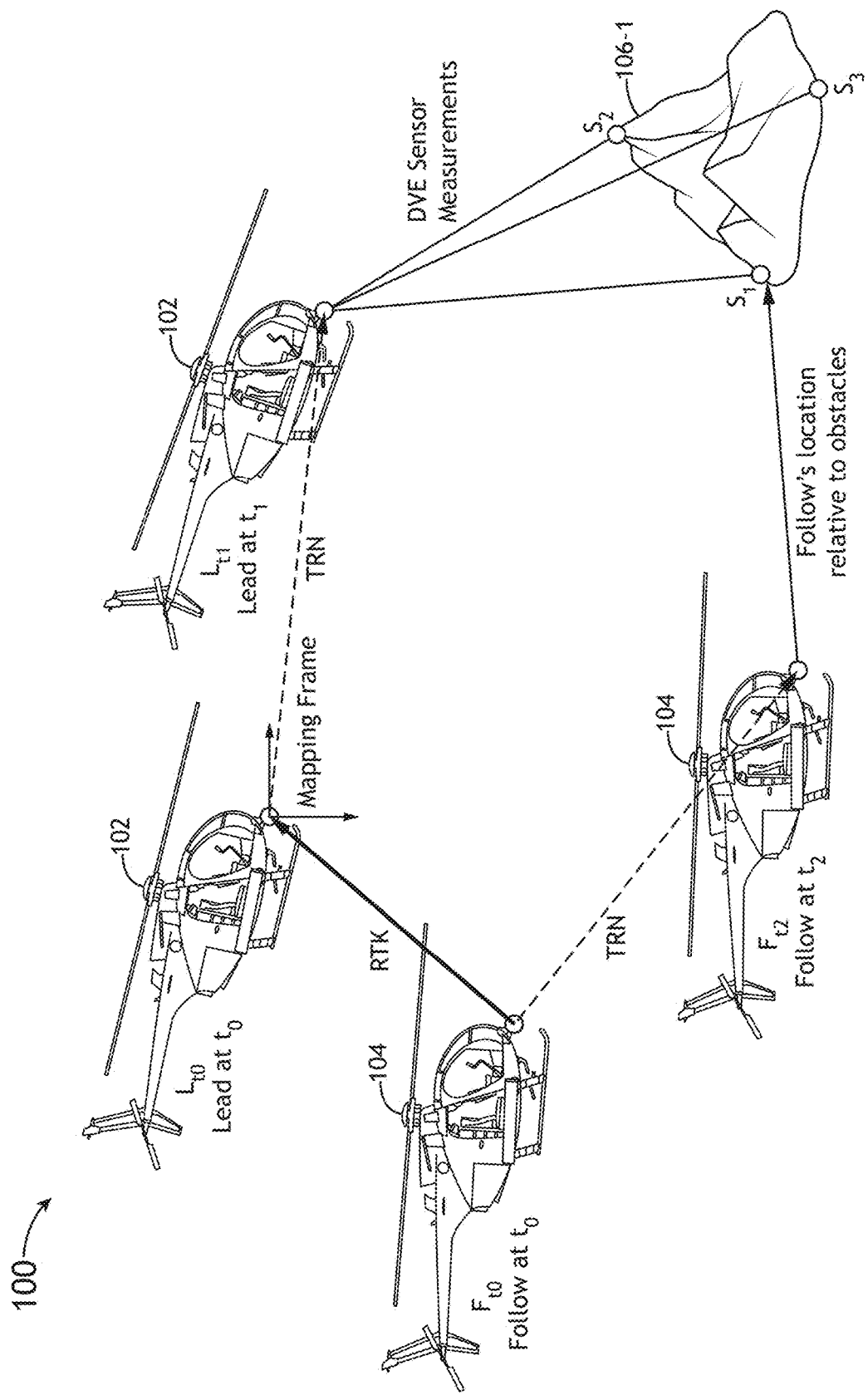
FIG. 2 is a view of the system of FIG. 1 according to the inventive concepts disclosed herein.

Referring now to FIG. 2, the system 100 of FIG. 1 is depicted with the lead aircraft 102 and the follower aircraft 104 shown at different times and positions relative to the object 106-1 according to the inventive concepts disclosed herein. The lead aircraft 102 is shown at times $t_0$ and $t_1$, where $t_1$ is after $t_0$. The follower aircraft is shown at times $t_0$ and $t_2$, where $t_2$ is after $t_1$.

The lead aircraft 102 (which may include sensors configured to determine a location of the object 106-1 in a DVE relative to the lead aircraft 102) may be configured to transfer the location of the object 106-1 to the follower aircraft 104 (which may lack sensors configured to determine the location of the object 106-1 in a DVE) based on measurements from a GNSS such that the follower aircraft 104 may be configured to determine the location of the object 106-1 relative to the follower aircraft 104.

The lead aircraft 102 may periodically reset an origin of a common reference frame and determine the lead aircraft 102's location with respect to that frame by an inertially-aided GPS time relative navigation (TRN) solution. The TRN solution may be obtained by differencing carrier phase (CP) measurements gathered at the lead aircraft 102 current location and those carrier phase measurements gathered at the moment when the lead aircraft 102 was at the origin of the current reference frame. Error analysis of the TRN solution shows that over a short period of time (several minutes) almost all error sources in the time-differenced carrier phase (TDCP) signal cancel out, with the main error source exceptions typically being satellite atomic clock drift and rare fast changing ionospheric events. If TDCP measurements are available on two frequencies, which is typically the case with military receivers, then ionospheric error in TDCP measurements can be alleviated. Typically, satellite atomic clock drift will cause an error growth in TDCP measurements of 2 millimeter/second (mm/sec) root mean square (RMS). Assuming horizontal dilution of precision (HDOP) of 1.5, which is typically available at 95% for a 24 satellite GPS constellation, horizontal position error will grow at a rate of 3 mm/sec RMS. Thus, in some embodiments, the 4-RMS bound will grow at a rate of 1.2 centimeter/second (cm/sec), meaning that after 100 seconds the TRN error can be bounded to 1.2 meters with high confidence. Some embodiments may utilize a high-integrity GPS TRN algorithm, which generates high confidence containment bounds, as disclosed in U.S. patent application Ser. No. 15/473,438, filed on Mar. 29, 2017, which is hereby expressly incorporated herein in its entirety.

The lead aircraft 102 may periodically send messages needed to construct a real-time kinematics (RTK) differential GPS (DGPS) solution to the follower aircraft 104 to determine a vector connecting the two aircraft 102, 104. RTK error over distances of several kilometers can be contained to sub-meter level with high confidence. A high-integrity, high-availability DGPS RTK algorithm has been developed for precision approach and automatic landing of aircraft on a moving ship, which is disclosed in S. Wu, S. Peck, R. Fries, G. McGraw. *Geometry Extra-Redundant Almost Fixed Solutions: A High Integrity Approach for Carrier Phase Ambiguity Resolution for High Accuracy Relative Navigation*, Proceeding of the IEEE/ION Position, Location, and Navigation Sympo (PLANS '2008), Monterey, Calif., April 2008 and which is expressly incorporated herein in its entirety. Some embodiments may utilize such high-availability DGPS RTK algorithm by the follower aircraft 104 to determine a vector connecting the two aircraft 102, 104.

Given the above containment bounds of TRN and RTK, which have a high availability, some embodiments may utilize the TRN-RTK approach to meet stringent navigation requirements needed for low-above ground level (low-AGL) operations (e.g., on the order of several meters at $10^{-4}$/approach probability). Also, if the follower aircraft 104 can compute an initial RTK fix (to the lead aircraft 102), the follower aircraft 104 may not lose the follower aircraft 104's high-integrity navigation solution if communication with the lead aircraft 102 is interrupted.

As shown in FIG. 2, the follower aircraft 104 can calculate the follower aircraft 104's relative position with respect to follower aircraft 104's position at the time of validity of the most recent RTK update between the lead aircraft 102 and the follower aircraft 104. By using a combination of DGPS RTK to determine a vector connecting the two aircraft 102, 104, and by using GPS TRN to determine location of each aircraft 102, 104 with respect to where the two aircraft 102, 104 were at the time of validity of the most recent RTK update, the follower aircraft 104 may estimate a relative position of the object 106-1 of interest, which was located by the lead aircraft 102, with respect to the follower aircraft 104.

The following notations for locations shown in FIG. 2 may be used:
$F_{t0}$—follower aircraft 104 position at time $t_0$
$L_{t0}$—lead aircraft 102 position at time $t_0$
$F_{t2}$—follower aircraft 104 position at time $t_2$
$L_{t1}$—lead aircraft 102 position at time $t_1$
$S_i$—position of static object 106-1, i The follower aircraft 104 determining the follower aircraft 104's location, with respect to the lead aircraft 102 using DGPS RTK with the time of validity at $t_0$, results in vector $F_{t0}L_{t0}$. A location of the lead aircraft 102 at time $t_0$ is now considered the origin of the common reference frame. As the lead aircraft 102 flies, the lead aircraft 102 determines the lead aircraft 102's position with respect to where the lead aircraft 102 was at time $t_0$ by using the GPS TRN technique, which results in vector $L_{t0}L_{t1}$. When the lead aircraft 102, by using sensors, locates an object 106-1 of interest $S_i$, the lead aircraft 102 estimates the object 106-1's location, given by the vector $L_{t1}S_i$, along with a containment bound on the object localization error. The lead aircraft 102 then updates an occupancy map, stored in the common reference frame with the origin at $L_{t0}$, and broadcasts an incremental update to the follower aircraft 104. At the time $t_2$ (which is $>t_1$), the follower aircraft 104 determines the follower aircraft's 104 location with respect to where the follower aircraft 104 was at time $t_0$ by using GPS TRN, which results in vector $F_{t0}F_{t2}$. Based on the foregoing vector derivations, the following vector equation can be deduced, which provides a result of a vector between the follower aircraft 104's location at $t_2$ and the object 106-1 of interest $S_i$:

$$F_{t2}S = F_{t0}L_{t0} + L_{t0}L_{t1} + L_{t1}S_i - F_{t0}F_{t2}$$

Vectors determined with TRN or RTK on the right-hand side of the above equation may have high confidence containment bounds that are determined with corresponding TRN and RTK algorithms. Such algorithms facilitate determination of containment bounds for object localization error by using at least one sensor (e.g., at least one light detection and ranging (LIDAR) sensor and/or at least one radio detection and ranging (radar) sensor). Since all these errors can be considered uncorrelated, a containment bound for an error can be determined in the follower aircraft 104 position with respect to a static object 106-1 $S_i$ by root-sum-squaring individual containment bounds.

As the lead aircraft 102 continues flight, an error may accumulate in the location of objects found in the past due to cumulative TRN errors. However, the error growth may be slow compared to the time for tactical approach. Thus TRN and RTK method described can be highly effective for transferring object 106-1 location data from the lead aircraft 102 to the follower aircraft 104.

Embodiments may include at least one computing device of the lead aircraft 102 executing one or more software applications or hosting one or more software applications. For example, the at least one computing device of the lead aircraft 102 may include software that when executed determines RTK updates and outputs the RTK updates for transmission to the follower aircraft 104. Additionally, the at least one computing device of the lead aircraft 102 may include software that when executed determines locations of the lead aircraft by utilizing TRN.

Embodiments may include at least one computing device of the follower aircraft 104 executing one or more software applications or hosting one or more software applications. For example, the at least one computing device of the follower aircraft 104 may include software that when executed is configured to perform RTK processing and TRN processing.

Figure 3:
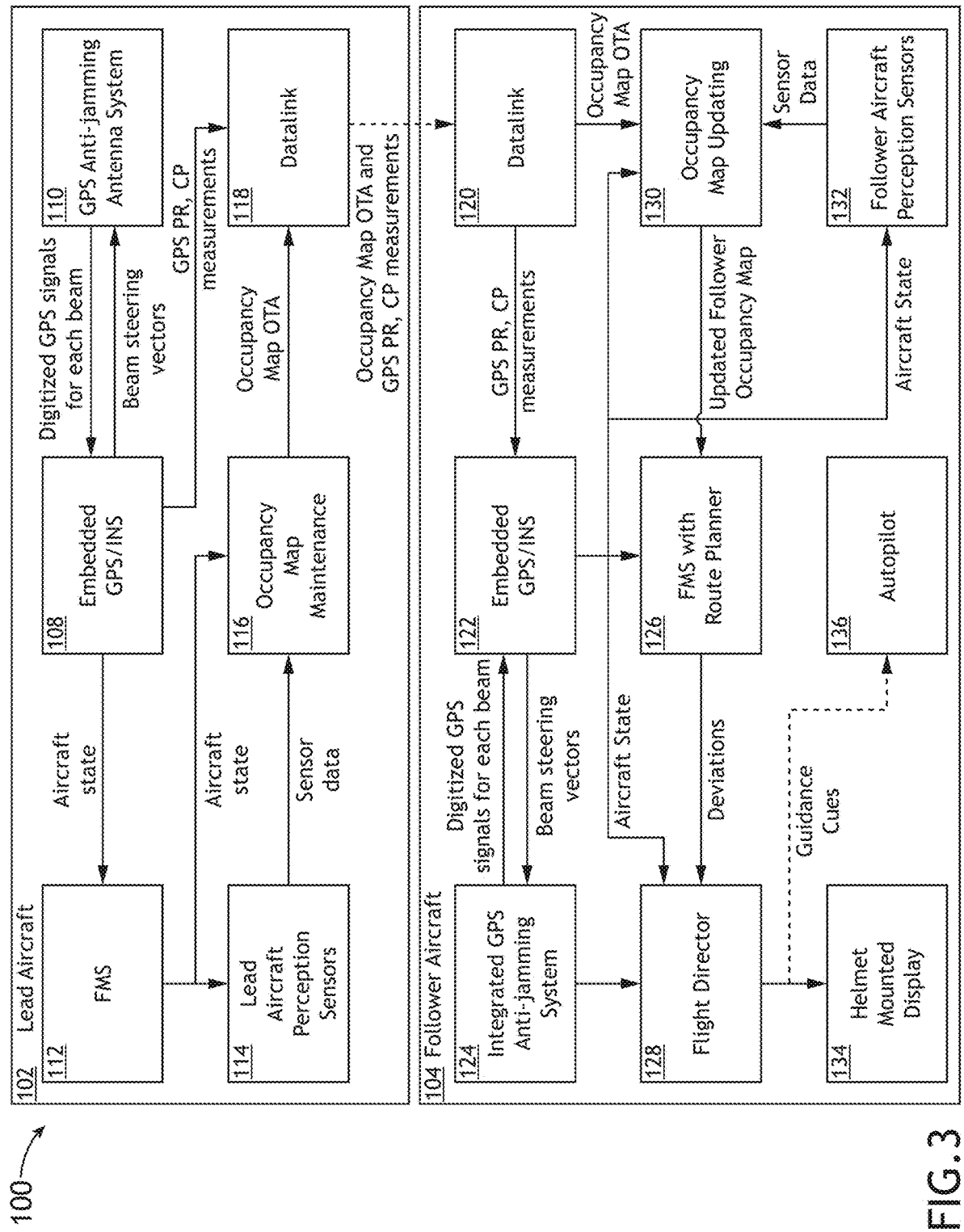
FIG. 3 is a view of the system of FIG. 1 according to the inventive concepts disclosed herein.

Referring now to FIG. 3, the system 100 of FIGS. 1-2 is depicted with exemplary components of the lead aircraft 102 and the follower aircraft 104 according to the inventive concepts disclosed herein.

The lead aircraft 102 may include at least one GNSS/inertial navigation system (INS) (e.g., at least one GPS/inertial navigation system (INS) 108 (e.g., an embedded GPS/INS)), at least one GPS anti-jamming antenna system 110, at least one flight management system (FMS) 112, at least one sensor 114 (e.g., lead aircraft perception sensors), at least one occupancy map maintenance 116, and at least one datalink 118, some or all of which may be communicatively coupled at any given time. Some or all of the GPS/INS 108, the GPS anti-jamming antenna system 110, the FMS 112, the sensor 114, the occupancy map maintenance 116, and the datalink 118 may be implemented as computing devices implemented with components similar to and functionality similar to the computing device 140 of FIG. 4. For example, the GPS/INS 108, the GPS anti-jamming antenna system 110, the FMS 112, the sensor 114, the occupancy map maintenance 116, and the datalink 118 may be implemented as a GPS/INS computing device, a GPS anti-jamming antenna system computing device, an FMS computing device, a sensor computing device, an occupancy map maintenance computing device, and a datalink computing device, each including at least one processor (e.g., 142). In some embodiments, operations disclosed throughout may be performed by at least one processor of at least one of such computing devices. For example, in some embodiments, operations disclosed throughout may be performed by multiple processors implemented across multiple computing devices. While the GPS/INS computing device, the GPS anti-jamming antenna system computing device, the FMS computing device, the sensor computing device, the occupancy map maintenance computing device, and the datalink computing device are exemplarily depicted as distinct computing devices, in some embodiments, one or more of such computing devices can be implemented as one or more integrated computing devices, each having functionality of two or more of such distinct computing devices.

The GPS/INS 108 may be configured to determine an aircraft state (e.g., a location and orientation) of the lead aircraft 102 at any given time. The GPS/INS 108 may be configured to perform operations commonly performed by a GPS/INS. The GPS/INS 108 may utilize GNSS measurements, such as GPS pseudorange (PR) and GPS carrier phase (CP) measurements, to determine the aircraft state. The GPS/INS 108 may be configured to output aircraft state data to various devices onboard the lead aircraft 102, such as the FMS 112. The GPS/INS 108 may be configured to output GNSS measurements, such as GPS PR and GPS CP measurements, to the datalink 118 for transmission to the follower aircraft 104. Additionally, the GPS/INS 108 may be configured to output beam steering vectors to the GPS anti-jamming antenna system 110 and to receive digitized GPS signals for each beam from the GPS anti-jamming antenna system 110. For example, the GPS/INS 108 may be configured to perform any or all of the following operations: receive sensor data from the sensor 114; determine a lead aircraft location at a time $t_0$ based at least on GNSS measurements; determine the lead aircraft location at a time $t_1$ relative to the lead aircraft location at the time $t_0$ by utilizing TRN, wherein $t_1$ is after $t_0$; determine an object location at the time $t_1$ relative to the lead aircraft location at the time $t_1$ based at least on the sensor data; and/or output an RTK update for transmission to the follower aircraft via a datalink, the RTK update including information (e.g., object location data and GNSS measurements, such as GPS PR and GPS CP measurements) associated with: the lead aircraft location at the time $t_0$, the lead aircraft location at the time $t_1$ relative to the lead aircraft location at the time $t_0$, and the object location at the time $t_1$ relative to the lead aircraft location at the time $t_1$. In some embodiments, the occupancy map maintenance 116 may be maintained in a non-transitory computer-readable medium (e.g., memory 144 and/or storage 146) of the GPS/INS 108.

The FMS 112 may be configured to manage a flight plan, manage a flight trajectory, and perform operations commonly performed by an FMS. The FMS 112 may include a route planner. The FMS 112 may be configured to receive and process aircraft state data from the GPS/INS 108. The FMS 112 may be configured to output processed aircraft state data to the sensor 114 and/or the occupancy map maintenance 116.

The at least one sensor 114 may be configured to map an environment, sense a location of at least one object 106-1, 106-2 in an environment relative to a location of the lead aircraft 102, and/or output sensor data associated with the sensed location of the at least one object 106-1, 106-2 to any of various components of the lead aircraft 102, such as the occupancy map maintenance 116 and/or the GPS/INS 108. For example, the at least one sensor 114 may be implemented as at least one LIDAR sensor and/or at least one radar sensor.

The occupancy map maintenance 116 may be implemented as a computing device including a non-transitory computer-readable medium (e.g., memory 144 and/or storage 146) or may be implemented on another computing device of the lead aircraft 102 such as on the GPS/INS 108. The occupancy map maintenance 116 may be configured to receive aircraft state data and sensor data to maintain a database of object locations relative to a current location of the lead aircraft 102. The occupancy map maintenance 116 may be configured to output information associated with object locations for transmission via the datalink 118 to the follower aircraft 104.

The datalink 118 may be configured to transmit and/or receive communications, such as RTK updates, GPS PR measurements, GPS CP measurements, and/or object location data, with the datalink 120. The datalink 118 may be implemented as at least one antenna.

The follower aircraft 104 may include at least one data link 120, at least one GNSS/INS (e.g., at least one GPS/INS 122 (e.g., an embedded GPS/INS)), at least one GPS anti-jamming antenna system 124 (e.g., an integrated GPS anti-jamming antenna system), at least one FMS 126 (e.g., an FMS with route planner), at least one flight director 128, at least one occupancy map updating 130, at least one sensor 132 (e.g., follower aircraft perception sensors), at least one head wearable device 134 (e.g., a helmet-mounted display), and at least one autopilot 136, some or all of which may be communicatively coupled at any given time. Some or all of the data link 120, the GPS/INS 122, the GPS anti-jamming system 124, the FMS 126, the flight director 128, the occupancy map updating 130, the sensor 132, the head wearable device 134, and the autopilot 136 may be implemented as computing devices implemented with components similar to and functionality similar to the computing device 140 of FIG. 4. For example, the data link 120, the GPS/INS 122, the GPS anti-jamming system 124, the FMS 126, the flight director 128, the occupancy map updating 130, the sensor 132, the head wearable device 134, and the autopilot 136 may be implemented as a data link computing device, a GPS/INS computing device, a GPS anti-jamming system computing device, an FMS computing device, a flight director computing device, an occupancy map updating computing device, a sensor computing device, a head wearable device computing device, and an autopilot computing device, each including at least one processor (e.g., 142). In some embodiments, operations disclosed throughout may be performed by at least one processor of at least one of such computing devices. For example, in some embodiments, operations disclosed throughout may be performed by multiple processors implemented across multiple computing devices. While the data link computing device, the GPS/INS computing device, the GPS anti-jamming system computing device, the FMS computing device, the flight director computing device, the occupancy map updating computing device, the sensor computing device, the head wearable device computing device, and the autopilot computing device computing device are exemplarily depicted as distinct computing devices, in some embodiments, one or more of such computing devices can be implemented as one or more integrated computing devices, each having functionality of two or more of such distinct computing devices.

The datalink 120 may be configured to transmit and/or receive communications, such as RTK updates, GPS PR measurements, GPS CP measurements, and/or object location data, with the datalink 118. The datalink 120 may be implemented as at least one antenna. For example, the datalink 120 may be configured to output received communications (e.g., RTK updates, GPS PR measurements, GPS CP measurements, and/or object location data) to the GPS/INS 122 and/or the occupancy map updating 130.

The GPS/INS 122 may be configured to determine an aircraft state (e.g., a location and orientation) of the follower aircraft 104 at any given time. The GPS/INS 122 may be configured to perform operations commonly performed by a GPS/INS. The GPS/INS 122 may utilize GNSS measurements, such as GPS pseudorange (PR) and GPS carrier phase (CP) measurements, to determine the aircraft state of the follower aircraft 104, as well as the lead aircraft 102. The GPS/INS 122 may be configured to output aircraft state data to various devices onboard the follower aircraft 104, such as the FMS 126, the flight director 128, the occupancy map updating 130, and/or the at least one sensor 132. The GPS/INS 122 may be configured to receive GNSS measurements, such as GPS PR and GPS CP measurements, from the datalink 120 as received from the lead aircraft 102. Additionally, the GPS/INS 122 may be configured to output beam steering vectors to the GPS anti-jamming antenna system 124 and to receive digitized GPS signals for each beam from the GPS anti-jamming antenna system 124. For example, the GPS/INS 122 may be configured to perform any or all of the following operations: determine a follower aircraft location at the time $t_0$ based at least on GNSS measurements; receive the RTK update from the lead aircraft via the datalink 118, 120; based at least on the RTK update, perform RTK processing to determine the follower aircraft location at the time $t_0$ relative to the lead aircraft location at a time $t_0$; determine the follower aircraft location at a time $t_2$ relative to the follower aircraft location at the time $t_0$ by utilizing TRN, wherein $t_2$ is after $t_1$; determine the object location at time $t_2$ relative to the follower aircraft location at the time $t_2$ based at least on the follower aircraft location at the time $t_0$ relative to the lead aircraft location at a time $t_0$, the lead aircraft location at the time $t_1$ relative to the lead aircraft location at the time $t_0$, the object location at the time $t_1$ relative to the lead aircraft location at the time $t_1$, and the follower aircraft location at the time $t_2$ relative to the follower aircraft location at the time $t_0$; and/or output the object location at time $t_2$ relative to the follower aircraft location at the time $t_2$ to the FMS 126. The RTK update may include information (e.g., object location data and GNSS measurements, such as GPS PR and GPS CP measurements) associated with: the lead aircraft location at the time $t_0$, the lead aircraft location at the time $t_1$ relative to the lead aircraft location at the time $t_0$, and the object location at the time $t_1$ relative to the lead aircraft location at the time $t_1$. In some embodiments, the occupancy map updating 130 may be maintained in a non-transitory computer-readable medium (e.g., memory 144 and/or storage 146) of the GPS/INS 122.

The FMS 126 may be configured to manage a flight plan, manage a flight trajectory, and perform operations commonly performed by an FMS. The FMS 126 may include a route planner. The FMS 112 may be configured to receive and process aircraft state data from the GPS/INS 122 and receive the object location at time $t_2$ relative to the follower aircraft location at the time $t_2$ from the GPS/INS 122 and/or from the occupancy map updating 130. The FMS 112 may be configured to output processed aircraft state data to the flight director 128 and/or to output flight trajectory deviations from a planned flight route to the flight director 128.

The flight director 128 may be configured to receive aircraft state data from the GPS/INS 122 and/or the FMS 126, to receive deviation data (e.g., associated with deviations to account for object locations) from the FMS 126, to receive digitized GPS signals for each beam from the GPS anti-jamming antenna system 124, to provide flight guidance cues to the head wearable device 134 and/or the autopilot 136, and/or to perform operations commonly performed by a flight director. The flight guidance cues may include graphical, textual, audible, and/or computer-readable flight instructions to change a flight trajectory on to a planned or updated flight route.

The occupancy map updating 130 may be implemented as a computing device including a non-transitory computer-readable medium (e.g., memory 144 and/or storage 146) or may be implemented on another computing device of the follower aircraft 104 such as on the GPS/INS 122. The occupancy map updating 116 may be configured to receive information associated with object locations via the datalink 118, 120 as received from the lead aircraft 102, to receive aircraft state data from the GPS/INS 122, and to receive additional object location data from the at least one sensor 132. The occupancy map updating 130 may be configured to update a database of object locations relative to a current location of the follower aircraft 104. The occupancy map maintenance 116 may be configured to output information associated with object locations to the FMS 126.

The at least one sensor 132 may be configured to map an environment, sense a location of at least one object 106-1, 106-2 in an environment relative to a location of the follower aircraft 104, and/or output sensor data associated with the sensed location of the at least one object 106-1, 106-2 to any of various components of the follower aircraft 104, such as the occupancy map updating 130 and/or the GPS/INS 122. For example, the at least one sensor 132 may be implemented as at least one LIDAR sensor and/or at least one radar sensor.

Figure 4:
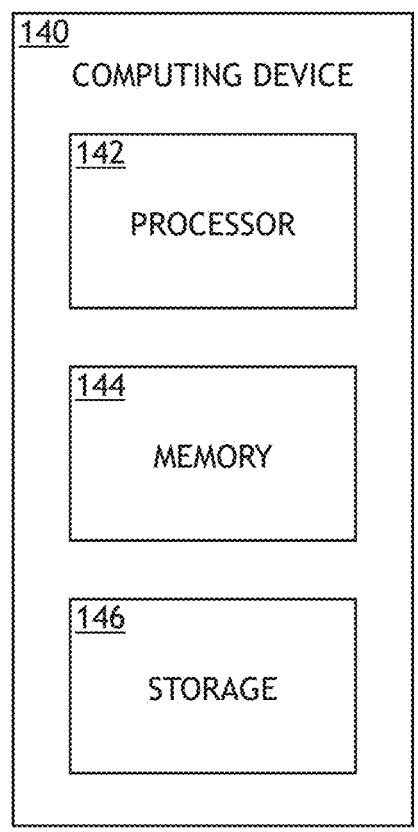
FIG. 4 is a view of an exemplary computing device of the system of FIG. 1 according to the inventive concepts disclosed herein.

Referring now to FIG. 4, an exemplary computing device 140 of the system 100 of FIGS. 1-3 according to inventive concepts disclosed herein is depicted. The computing device 140 may include at least one processor 142, at least one memory 144, and at least one storage device 146, some or all of which may be communicatively coupled at any given time. The processor 142 may be configured to perform any or all of the operations disclosed throughout. The computing device 142 may be implemented as any suitable computing device. The processor 142 may be configured to run various software applications or computer code stored (e.g., maintained) in a non-transitory computer-readable medium (e.g., memory 144 and/or storage 146) and configured to execute various instructions or operations.

The lead aircraft 102 and the follower aircraft 104 may each include at least one computing device implemented with similar components and functionality as the computing device 140. For example, the GPS/INS 108, the GPS anti-jamming antenna system 110, the FMS 112, the sensor 114, the occupancy map maintenance 116, and the datalink 118 may be implemented as a GPS/INS computing device, a GPS anti-jamming antenna system computing device, an FMS computing device, a sensor computing device, an occupancy map maintenance computing device, and a datalink computing device, each including at least one processor (e.g., 142). For example, the data link 120, the GPS/INS 122, the GPS anti-jamming system 124, the FMS 126, the flight director 128, the occupancy map updating 130, the sensor 132, the head wearable device 134, and the autopilot 136 may be implemented as a data link computing device, a GPS/INS computing device, a GPS anti-jamming system computing device, an FMS computing device, a flight director computing device, an occupancy map updating computing device, a sensor computing device, a head wearable device computing device, and an autopilot computing device, each including at least one processor (e.g., 142).

For example, at least one processor (e.g., 142), which may be implemented in one computing device or across multiple computer devices, of the lead aircraft 102 may be configured to: receive sensor data from the sensor 114; determine a lead aircraft location at a time $t_0$ based at least on GNSS measurements; determine the lead aircraft location at a time $t_1$ relative to the lead aircraft location at the time $t_0$ by utilizing TRN, wherein $t_1$ is after $t_0$; determine an object location at the time $t_1$ relative to the lead aircraft location at the time $t_1$ based at least on the sensor data; and/or output an RTK update for transmission to the follower aircraft via a datalink, the RTK update including information (e.g., object location data and GNSS measurements, such as GPS PR and GPS CP measurements) associated with: the lead aircraft location at the time $t_0$, the lead aircraft location at the time $t_1$ relative to the lead aircraft location at the time $t_0$, and the object location at the time $t_1$ relative to the lead aircraft location at the time $t_1$.

For example, at least one processor (e.g., 142), which may be implemented in one computing device or across multiple computer devices, of the follower aircraft 104 may be configured to: determine a follower aircraft location at the time $t_0$ based at least on GNSS measurements; receive the RTK update from the lead aircraft via the datalink 118, 120; based at least on the RTK update, perform RTK processing to determine the follower aircraft location at the time $t_0$ relative to the lead aircraft location at a time $t_0$; determine the follower aircraft location at a time $t_2$ relative to the follower aircraft location at the time $t_0$ by utilizing TRN, wherein $t_2$ is after $t_1$; determine the object location at time $t_2$ relative to the follower aircraft location at the time $t_2$ based at least on the follower aircraft location at the time $t_0$ relative to the lead aircraft location at a time $t_0$, the lead aircraft location at the time $t_1$ relative to the lead aircraft location at the time $t_0$, the object location at the time $t_1$ relative to the lead aircraft location at the time $t_1$, and the follower aircraft location at the time $t_2$ relative to the follower aircraft location at the time $t_0$; and/or output the object location at time $t_2$ relative to the follower aircraft location at the time $t_2$ to the FMS 126.

As will be appreciated from the above, embodiments of the inventive concepts disclosed herein may be directed to a system and a method for transferring locations of objects of interest from a lead aircraft to a follower aircraft based on GNSS measurements.

As used throughout and as would be appreciated by those skilled in the art, "at least one non-transitory computer-readable medium" may refer to as at least one non-transitory computer-readable medium (e.g., memory 144, storage 146, or a combination thereof; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
 a follower aircraft; and
 a lead aircraft, comprising:
  at least one sensor configured to sense a location of an object in an environment relative to a location of the lead aircraft and output sensor data associated with the sensed location of the object;
  at least one lead aircraft processor communicatively coupled to the at least one sensor, the at least one lead aircraft processor configured to:
   receive the sensor data;
   determine a lead aircraft location at a time $t_0$ based at least on global navigation satellite system (GNSS) measurements;
   determine the lead aircraft location at a time $t_1$ relative to the lead aircraft location at the time $t_0$ by utilizing time relative navigation (TRN), wherein $t_1$ is after $t_0$;
   determine an object location at the time $t_1$ relative to the lead aircraft location at the time $t_1$ based at least on the sensor data;
   output a real-time kinematics (RTK) update for transmission to the follower aircraft via a datalink, the RTK update including information associated with: the lead aircraft location at the time $t_0$, the lead aircraft location at the time $t_1$ relative to the lead aircraft location at the time $t_0$, and the object location at the time $t_1$ relative to the lead aircraft location at the time $t_1$;
 wherein the follower aircraft comprises:
  at least one follower aircraft processor, the at least one follower aircraft processor configured to:
   determine a follower aircraft location at the time $t_0$ based at least on GNSS measurements;
   receive the RTK update from the lead aircraft via the datalink;
   based at least on the RTK update, perform RTK processing to determine the follower aircraft location at the time $t_0$ relative to the lead aircraft location at a time $t_0$;
   determine the follower aircraft location at a time $t_2$ relative to the follower aircraft location at the time $t_0$ by utilizing TRN, wherein $t_2$ is after $t_1$; and
   determine the object location at time $t_2$ relative to the follower aircraft location at the time $t_2$ based at least on the follower aircraft location at the time $t_0$ relative to the lead aircraft location at a time $t_0$, the lead aircraft location at the time $t_1$ relative to the lead aircraft location at the time $t_0$, the object location at the time $t_1$ relative to the lead aircraft location at the time $t_1$, and the follower aircraft location at the time $t_2$ relative to the follower aircraft location at the time $t_0$.

2. The system of claim 1, wherein the lead aircraft is a lead helicopter and the follower aircraft is a follower helicopter.

3. The system of claim 1, wherein the at least one sensor comprises at least one of: at least one light detection and ranging (LIDAR) sensor and at least one radio detection and ranging (radar) sensor.

4. The system of claim 1, wherein the RTK update further includes occupancy map data, global positioning system (GPS) pseudorange (PR) measurements, and GPS carrier phase (CP) measurements.

5. The system of claim 1, wherein one or more of the at least one lead aircraft processor is implemented in a GNSS/inertial navigation system (INS) computing device.

6. The system of claim 1, wherein one or more of the at least one follower aircraft processor is implemented in a GNSS/inertial navigation system (INS) computing device.

7. The system of claim 1, wherein the object is an obstacle.

8. The system of claim 1, wherein the object is a landing zone.

9. The system of claim 1, wherein the follower aircraft is configured to avoid or proceed to the object based at least on the object location at time $t_2$ relative to the follower aircraft location at the time $t_2$.

10. The system of claim 1, wherein at least one of the lead aircraft and the follower aircraft further comprises at least one global positioning system (GPS) anti-jamming antenna system.

11. The system of claim 1, wherein the follower aircraft further comprises a flight director configured to provide guidance cues to avoid or proceed to the object based at least on the object location at time $t_2$ relative to the follower aircraft location at the time $t_2$.

12. A system, comprising:
 a follower aircraft, comprising:
  at least one follower aircraft processor, the at least one follower aircraft processor configured to:
   determine a follower aircraft location at a time $t_0$ based at least on global navigation satellite system (GNSS) measurements;
   receive a real-time kinematics (RTK) update from a lead aircraft via a datalink, the RTK update including information associated with: a lead aircraft location at the time $t_0$, the lead aircraft location at a time $t_1$ relative to the lead aircraft location at the time $t_0$, and an object location at the time $t_1$ relative to the lead aircraft location at the time $t_1$, wherein $t_1$ is after $t_0$;
   based at least on the RTK update, perform RTK processing to determine the follower aircraft location at the time $t_0$ relative to the lead aircraft location at a time $t_0$;
   determine the follower aircraft location at a time $t_2$ relative to the follower aircraft location at the time $t_0$ by utilizing time relative navigation (TRN), wherein $t_2$ is after $t_1$; and
   determine the object location at time $t_2$ relative to the follower aircraft location at the time $t_2$ based at least on the follower aircraft location at the time $t_0$ relative to the lead aircraft location at a time $t_0$, the lead aircraft location at the time $t_1$ relative to the lead aircraft location at the time $t_0$, the object location at the time $t_1$ relative to the lead aircraft location at the time $t_1$, and the follower aircraft location at the time $t_2$ relative to the follower aircraft location at the time $t_0$.

13. The system of claim 12, wherein the follower aircraft is a follower helicopter.

14. The system of claim 12, wherein the RTK update further includes occupancy map data, global positioning system (GPS) pseudorange (PR) measurements, and GPS carrier phase (CP) measurements.

15. The system of claim 12, wherein one or more of the at least one follower aircraft processor is implemented in a GNSS/inertial navigation system (INS) computing device.

16. The system of claim 12, wherein the follower aircraft is configured to avoid or proceed to an object at the object location based at least on the object location at time $t_2$ relative to the follower aircraft location at the time $t_2$.

17. The system of claim 12, wherein the follower aircraft further comprises at least one global positioning system (GPS) anti-jamming antenna system.

18. The system of claim 12, wherein the follower aircraft further comprises a flight director configured to provide guidance cues to avoid or proceed to an object at the object location based at least on the object location at time $t_2$ relative to the follower aircraft location at the time $t_2$.

19. A system, comprising:
a follower aircraft; and
a lead aircraft, comprising:
at least one sensor configured to sense a location of an object in an environment relative to a location of the lead aircraft and output sensor data associated with the sensed location of the object;
at least one lead aircraft processor communicatively coupled to the at least one sensor, the at least one lead aircraft processor configured to:
receive the sensor data;
determine a lead aircraft location at a time $t_0$ based at least on global navigation satellite system (GNSS) measurements;
determine the lead aircraft location at a time $t_1$ relative to the lead aircraft location at the time $t_0$ by utilizing time relative navigation (TRN), wherein $t_1$ is after $t_0$;
determine an object location at the time $t_1$ relative to the lead aircraft location at the time $t_1$ based at least on the sensor data;
output a real-time kinematics (RTK) update for transmission to the follower aircraft via a datalink, the RTK update including information associated with: the lead aircraft location at the time $t_0$, the lead aircraft location at the time $t_1$ relative to the lead aircraft location at the time $t_0$, and the object location at the time $t_1$ relative to the lead aircraft location at the time $t_1$.

20. The system of claim 19, wherein one or more of the at least one lead aircraft processor is implemented in a GNSS/inertial navigation system (INS) computing device.

* * * * *